Aug. 10, 1943.                J. F. THOMPSON                2,326,414
                              STORAGE CONTAINER
                              Filed Jan. 12, 1940
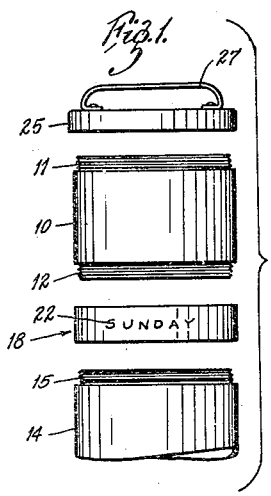
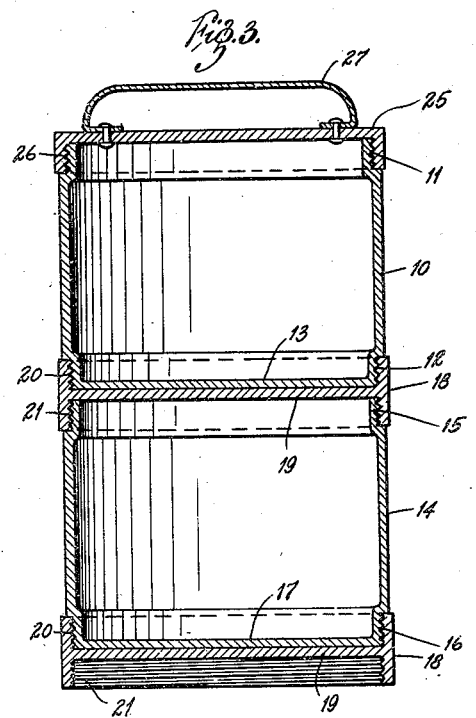
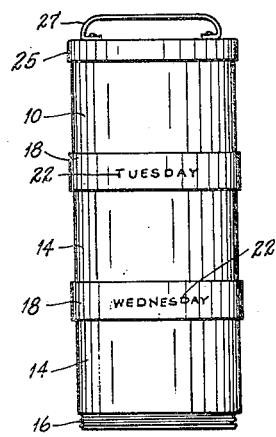
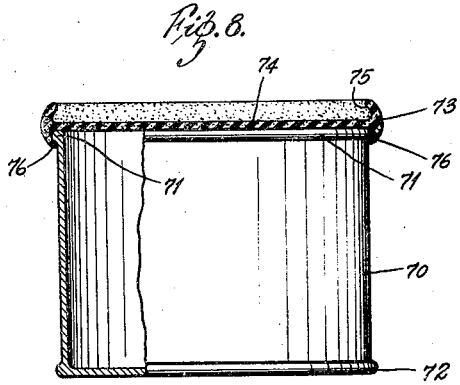
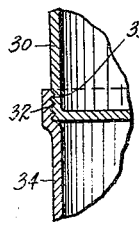
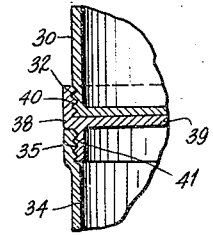
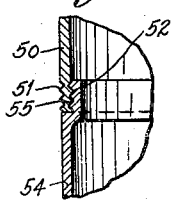
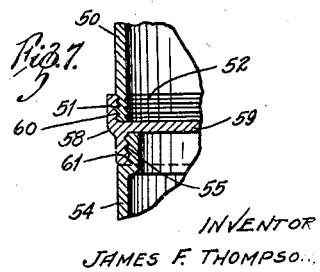
INVENTOR
JAMES F. THOMPSON
BY Lawrence C. Kingsland
ATTORNEY Patented Aug. 10, 1943

2,326,414

UNITED STATES PATENT OFFICE 2,326,414

STORAGE CONTAINER

James F. Thompson, St. Louis, Mo.

Application January 12, 1940, Serial No. 313,508

1 Claim. (Cl. 220—4)

The present invention relates to storage containers, and particularly to containers for storing food and the like in refrigerators.

Objects of the invention are to provide a series of containers that may be attached together in superposed relationship in any desired number, with unions for joining them which desirably indicate the date of the material within the particular container, and which unions have partitions therein that close off the interior of the container below the union from the container above the union.

Other objects are to provide containers that may be joined either with or without unions.

In the drawing:

Fig. 1 shows a plurality of container units, a cap and a union;

Fig. 2 shows a composite container consisting of three units, two unions and a cap;

Fig. 3 is a sectional view of a composite container;

Fig. 4 shows how the containers may be joined together without the unions;

Fig. 5 shows the containers of Fig. 4 joined with a union;

Fig. 6 shows containers without bottoms joined together without a union to make a single larger container;

Fig. 7 shows the containers of Fig. 6 joined with a union forming two separate units; and, Fig. 8 is a modified type.

Referring to Figs. 1–4, inclusive, a container unit 10, which in this case is cylindrical, has a threaded portion 11 at the top and a threaded portion 12 at the bottom. The container has a bottom 13. A second unit 14 has a threaded portion 15 at its top, a threaded portion 16 at its bottom, and a bottom 17.

A union generally indicated at 18 is circular and has a complete partition 19 medially thereacross. On opposite sides of the partition 19 the union is internally threaded as at 20 and 21. The union has a date indication 22 thereon.

There is also provided a cap 25 internally threaded as at 26, and having a handle 27 on the top thereof.

In use, the food or the like is placed in one container, such as 10. If there is only one portion of food, the cap 25 is then engaged over the threads 11 (and herein threads are representative of all quick-acting attaching means), which seals the container, and the same may be conveniently disposed in the refrigerator, the operation being facilitated by the handle 27.

When there are additional portions, as on subsequent dates, a union 18 is engaged over the lower threads 12 of the unit 10. An additional container 14 then has its upper threads 15 engaged into the lower threads 21 of the union. The union is selected to have a date indication for the food within the lower container. It will be seen that the partition wall 19 forms a cover for the unit 14 and protects the contents from any dirt that may have been picked up on the bottom 13 of the upper unit 10.

In like manner, additional units may be added below the unit 14, Fig. 3 showing a union in place just prior to the addition of such additional unit, and Fig. 2 showing the unit in place.

In the type of Fig. 4, the two container units are shown at 30 and 34. The unit 30 has lower threads 32 engageable by internal upper threads 35 on the container unit 34. The two may thus be connected directly together. There is, for reasons of its manifest desirability, a union 38 having a complete partition 39, and having internal threads 40 engageable with the threads 32, and external threads 41 engageable with the threads 35, as shown in Fig. 5. In this way, the units may be used either with or without the union, which may be desirable when several containers are filled the same day.

In the type of Fig. 6, the units 50 and 54 are not provided with bottoms, they being tubular. The lower edge of the unit 50 is threaded, both internally and externally, at 51 and 52. The lower unit 54 has upper external threads 55 engageable within the threads 52 of the unit 50. When two units are thus joined, as in Fig. 6, a single larger container results. But if, as in Fig. 7, a union 58 be used, with its partition 59, the two tubular units are divided off. The unit 58 has upper internal threads 60 engageable with the external threads 51 on the lower end of the unit 50, and lower internal threads 61 engageable over the upper threads 55 of the unit 54.

It is understood that the assemblies of Figs. 4–7 may be made up of any number of units, as in Figs. 1–3, and are not limited to two.

In the modification of Fig. 8, each container unit 70 is provided with an upper flange 71 and a lower flange 72. Rubber (and hence flexible) unions 73 have partition walls 74 and upper and lower concave flanges 75 and 76 that may be engaged over the flanges 71 and 72.

What is claimed is:

In a container device, a plurality of units each having an upper threaded portion and a lower threaded portion, the lower threaded portion having both external and internal threads thereon, the upper threads of each container being sized to engage with one of the threads on the lower part of each other unit whereby said units may be joined directly together, and a union having a partition medially thereacross and threads on each side of said partition, said threads being engageable with the other of the lower threads of one unit and the upper threads of another unit to hold said units together, said partition covering the lower unit and protecting the contents thereof.

JAMES F. THOMPSON.